United States Patent
Guyer

(10) Patent No.: US 11,176,063 B2
(45) Date of Patent: Nov. 16, 2021

(54) OPTIMIZED USE OF PROCESSOR MEMORY FOR I/O OPERATIONS

(71) Applicant: EMC IP Holding Company LLC, Hopkinton, MA (US)

(72) Inventor: James Guyer, Northboro, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 52 days.

(21) Appl. No.: 16/672,245

(22) Filed: Nov. 1, 2019

(65) Prior Publication Data

US 2021/0133122 A1  May 6, 2021

(51) Int. Cl.
| | |
|---|---|
| G06F 13/16 | (2006.01) |
| G06F 13/20 | (2006.01) |
| G06F 12/14 | (2006.01) |
| G06F 12/0831 | (2016.01) |
| G06F 12/06 | (2006.01) |
| G06F 12/02 | (2006.01) |
| G06F 12/0806 | (2016.01) |

(52) U.S. Cl.
CPC ...... *G06F 13/1652* (2013.01); *G06F 12/0284* (2013.01); *G06F 12/0292* (2013.01); *G06F 12/063* (2013.01); *G06F 12/0806* (2013.01); *G06F 12/0835* (2013.01); *G06F 12/1441* (2013.01); *G06F 13/20* (2013.01); *G06F 2212/62* (2013.01)

(58) Field of Classification Search
CPC ............. G06F 12/0284; G06F 12/0292; G06F 12/063; G06F 12/0806; G06F 2212/62; G06F 2212/206; G06F 13/1652; G06F 13/1657

See application file for complete search history.

(56) References Cited

U.S. PATENT DOCUMENTS

| | | | |
|---|---|---|---|
| 9,146,890 B1* | 9/2015 | Brown | G06F 13/4022 |
| 9,864,701 B1* | 1/2018 | Khan | G06F 13/102 |
| 10,585,827 B1* | 3/2020 | Cannata | G06F 13/4221 |
| 2007/0005865 A1* | 1/2007 | Spry | G06F 13/1663 710/306 |

(Continued)

*Primary Examiner* — Tracy A Warren
(74) *Attorney, Agent, or Firm* — EMC IP Holding Company LLC

(57) ABSTRACT

A system may include a plurality processing cores for processing I/O operations and at least one interconnect component for communicatively coupling one or more external components to the plurality of processing cores. The at least one interconnect component may be directly physically connected to each of the plurality of processing cores. The interconnect component may route I/O operations to one of the processing cores based on a memory range of the I/O operation. An I/O communication including an I/O operation may be received at the interconnect component. The memory address range of the I/O operation may be determined. A processing core corresponding to the determined memory address range of the I/O operation may be determined, for example, by accessing a data structure that maps address ranges to processing cores. An I/O communication including the I/O operation may be sent from the interconnect component to the determined processing core.

20 Claims, 4 Drawing Sheets

(56) References Cited

U.S. PATENT DOCUMENTS

| | | | |
|---|---|---|---|
| 2008/0098178 A1* | 4/2008 | Veazey | G06F 9/544 |
| | | | 711/147 |
| 2008/0126707 A1* | 5/2008 | Sistla | G06F 12/084 |
| | | | 711/118 |
| 2008/0126750 A1* | 5/2008 | Sistla | G06F 12/0831 |
| | | | 712/30 |
| 2010/0191920 A1* | 7/2010 | Fang | G06F 12/1027 |
| | | | 711/146 |
| 2011/0296117 A1* | 12/2011 | Fukuda | G06F 12/1483 |
| | | | 711/154 |
| 2014/0115223 A1* | 4/2014 | Guddeti | G06F 13/14 |
| | | | 710/314 |
| 2014/0149690 A1* | 5/2014 | Chirca | G06F 13/1663 |
| | | | 711/146 |
| 2015/0261701 A1* | 9/2015 | Craddock | G06F 13/28 |
| | | | 711/135 |
| 2017/0185449 A1* | 6/2017 | Zhang | G06F 9/5027 |
| 2017/0228164 A1* | 8/2017 | Jayasena | G06F 12/0802 |
| 2018/0373633 A1* | 12/2018 | Herdrich | G06F 9/45558 |
| 2019/0050335 A1* | 2/2019 | Natu | G06F 12/0893 |
| 2020/0050402 A1* | 2/2020 | Furey | G06F 3/0688 |
| 2020/0151124 A1* | 5/2020 | Thomas | G06F 13/4295 |
| 2020/0192820 A1* | 6/2020 | Nair | G06F 9/544 |

* cited by examiner

OPTIMIZED USE OF PROCESSOR MEMORY FOR I/O OPERATIONS

BACKGROUND

Technical Field

This application generally relates to data storage systems, and more particularly to use processor memory to process I/O operations.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device (PSD) of the storage system, one or more components of the host system, storage system and network components therebetween may be used.

SUMMARY OF THE INVENTION

In some embodiments of the invention, a method is performed for a system including a plurality processing cores for processing I/O operations and at least one interconnect component for communicatively coupling one or more external components to the plurality of processing cores, the at least one interconnect component directly physically connected to each of the plurality of processing cores. The method includes receiving an I/O communication at a first of the at least one interconnect component, the I/O communication specifying an I/O operation associated with a memory address range, determining a first of the plurality of processing cores that corresponds to the I/O communication based at least in part on the memory address range, and sending a second I/O communication specifying at least a first portion of the I/O operation to the first processing core based at least in part on the determination that the first processing core corresponds to the I/O communication. The system may further include a plurality of memory components, each of the plurality of memory components dedicated to a respective one of the plurality of processing cores, where the method may further include determining that a first memory component of the plurality of memory components corresponds to at least a first portion the memory address range, wherein the first memory component is dedicated to the first processing component, and wherein the determination of the first processing core is based at least in part on the determination that the first memory component corresponds to the at least first portion of the memory address range. The system may further include determining that a second memory component of the plurality of memory components corresponds to at least a second portion the memory address range, where the second memory component is dedicated to a second of the plurality of processing components, and sending a third I/O communication specifying at least a second portion of the I/O operation to the second processing core based at least in part on the determination that the second memory component of the plurality of memory components corresponds to the at least a second portion the memory address range. The system may further include a data structure including a plurality of entries, each entry specifying a memory address range and a processing core corresponding to the memory address range, and determining the first of the plurality of processing cores includes accessing an entry of the data structure may specify at least a portion of the memory address associated with the I/O operation. Determining the first of the plurality of processing cores may include performing a mathematical operation on the memory address range, and selecting the first of the plurality of processing cores based on the result of the mathematical operation. The first I/O communication may specify a port associated with a second of the plurality of processing cores, and determining a first of the plurality of processing cores may include overriding the specification of the port. The plurality of processing cores may include only two processing cores, including the first processing core and a second processing core, in which a memory space of the system is interweaved between the first processing core and the second processing core according to a uniform memory access scheme.

In some embodiments, a system includes a plurality processing cores for processing I/O operations and at least one interconnect component for communicatively coupling one or more external components to the plurality of processing cores, the at least one interconnect component directly physically connected to each of the plurality of processing cores. The system further includes one or more processors, and memory including code stored thereon that, when executed, performs the above-described method.

In some embodiments, one or more computer-readable media, for example, non-transitory computer-readable media, are provided for a system including a plurality processing cores for processing I/O operations and at least one interconnect component for communicatively coupling one or more external components to the plurality of processing cores, the at least one interconnect component directly physically connected to each of the plurality of processing cores. The one or more computer-readable media has software stored thereon that includes executable instructions to perform the above-described method.

BRIEF DESCRIPTION OF THE DRAWINGS

Features and advantages of the present invention will become more apparent from the following detailed description of illustrative embodiments thereof taken in conjunction with the accompanying drawings in which.

DETAILED DESCRIPTION OF EMBODIMENTS

Figure 1:
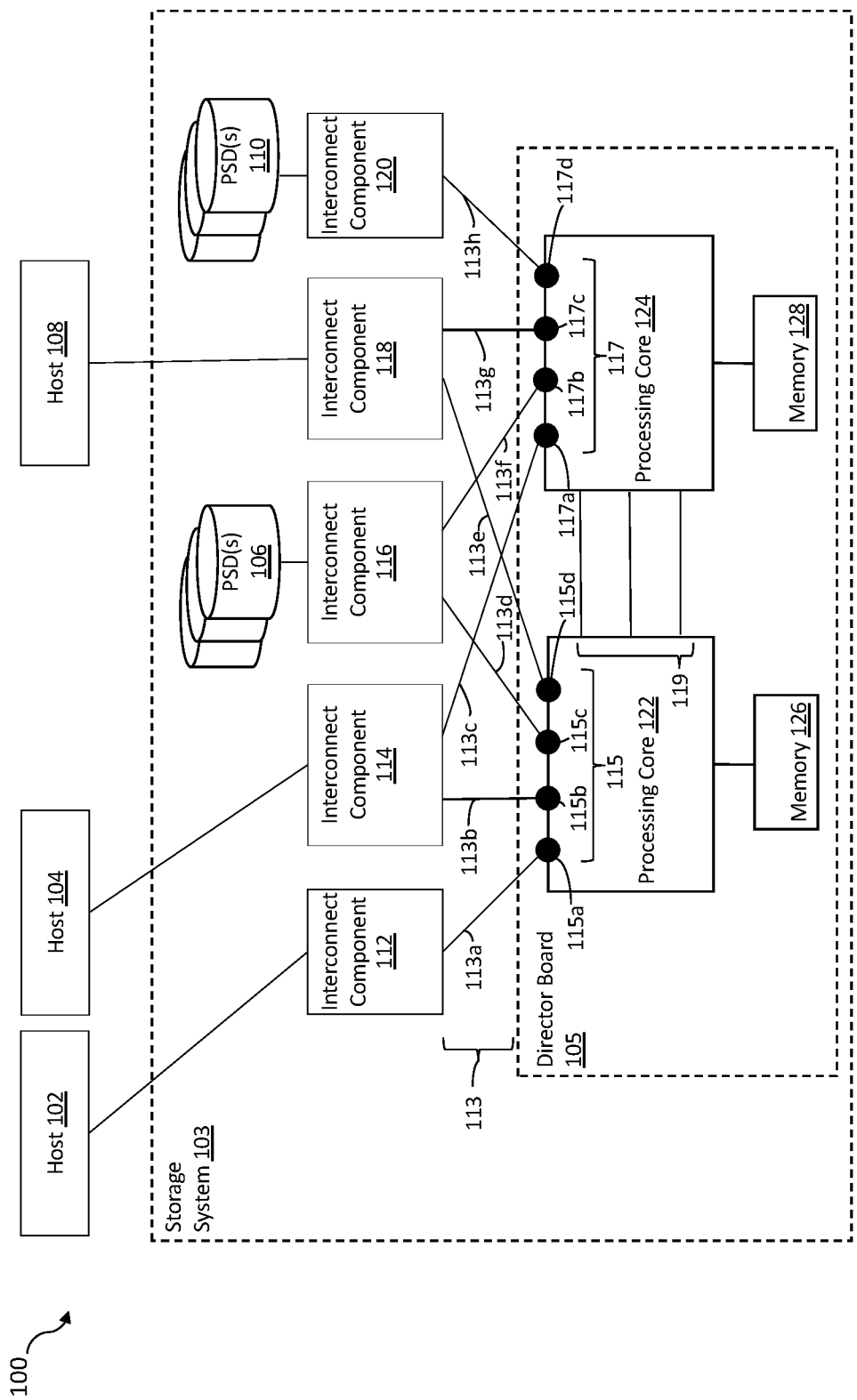
FIG. 1 is a block diagram illustrating an example of a system for processing I/O operations, according to embodiments of the invention.

FIG. 1 is a block diagram illustrating an example of a system 100 for processing I/O operations, for example, as part of a data storage system, e.g., a PowerMax™ storage system made available from EMC Corporation having offices in Hopkinton, Mass. The system may include any of: host systems 102, 104 and 108; PSD(s) 106 and 110; interconnect components 112, 114, 116, 118 and 120; processing cores 122 and 124; memory components 126 and 128; other components; or any suitable combination of the foregoing. It should be appreciated that, while in the embodiment illustrated in FIG. 1 there are two processing cores 122 and 124, the invention is not so limited, as there may be more than two processing cores.

Each of the processing cores 122 and 124 may be configured to process I/O operations, and may be implemented as a combination of hardware, firmware and/or software, for example, on a CPU chip or the like. Each of the processing cores 122 and 124 may have its own dedicated memory directly connected thereto, for example, memory components 126 and 128 respectively, each of which may be a DRAM (e.g., Double Data Rate (DDR) Synchronous Dynamic Random Access Memory (SDRAM)) or another type of memory. The processing cores 122 and 124 may be interconnected by high-speed inter-core links 119 to support cache coherency and to allow each processing core to access the memory component dedicated to the other processing core, for example, when processing I/O operations initiated by hosts 102, 104 and 106.

Each of the processing cores 122 and 124 may be connected to multiple components external to the processing cores (e.g., external components), including any of the hosts 102, 104 and 106, and PSD(s) 106 and 110, by one or more interconnect components, for example, interconnect components 112, 114, 116, 118 and 120. Each of these interconnect components may be any of a variety of interconnect components, including, but not limited to, PCIe devices. Each of the processing cores 122 and 124 may be connected to each of the ICs 112, 114, 116, 118 and 120 over one or more direct physical links (e.g., wire, cable or optical fiber) 113 by one or more external interconnect ports (e.g., PCIe ports) 115 and 117, respectively, which may be referred to herein as "core ports." For example: the core port 115a may connect the processing core 122 directly to the IC 112 over the link 113a; the core port 115b may directly connect the processing core 122 to the IC 114 over the link 113b; the core port 115c may directly connect the processing core 122 to the IC 116 over the link 113d; the core port 115d may directly connect the processing core 122 to the IC 118 over the link 113e; the core port 117a may directly connect the processing core 124 to the IC 114 over the link 113c; the core port 117b may directly connect the processing core 124 to the IC 116 over the link 113f; the core port 117c may directly connect the processing core 124 to the IC 118 over the link 113g; and the core port 117d may directly connect the processing core 124 to the IC 120 over the link 113h. When there are multiple processing cores (e.g., within a pair of CPU chips), the processing cores may share the memory components, high speed inter-core links, core ports, host systems, PSDs, and other interconnect components.

One or more of the ICs (e.g., ICs 114, 116 and 118) may be connected to both processing cores, and in some embodiments may be multi-host PCIe 10 devices (in this context, i.e., from the perspective of the PCIe device, the term "host" refers to a processing core); and one or more of the ICs (e.g., 112 and 120) may be connected to only one of the processing cores 122 or 124, and in some embodiments may be a single-host PCIe.

In some embodiments, the system 100 may be part of a data storage network, including the hosts 102, 104 and 108, and a data storage system 103 (e.g., a PowerMax storage system), which may include any of the PSD(s) 106 and 110, the ICs 112, 114, 116, 118 and 120, the processing cores 122 and 124, the memory components 126 and 128. In such embodiments, the storage system 103 may be connected to the hosts 102, 104 and 108 over one or more networks (not shown), for example, one or more network fabrics. In some embodiments, the processing cores 122 and 124, and the memory 126 and 128 may reside on a director circuit board, e.g., director board 105, for example, as part of a PowerMax storage system.

At least a portion of a memory space of the system 100 (e.g., of the storage system 103) may be partitioned to the memory components 126 and 128. During the performance of I/O operations, for example, read and write operations, involving one of the hosts 102, 104 and 108 and/or one of the PSD(s) 106 and 110, data may be cached in one or both of the memory components 126 and 128. Each of the processing cores 122 and 124 may be configured (e.g., with logic and or data structures) with knowledge of the memory address ranges within the memory components 126 and 128. Each of the processing cores 122 and 124, in response to receiving an I/O (e.g., read or write) operation at one of its core ports 115 and 117, respectively, may determine a memory address range corresponding to the I/O operation, and determine which of the memory components 126 or 128 includes the determined address. The processing core then may read data to, or write data from, the determined memory component in accordance with the I/O operation.

If the determined memory component is not the memory component directly connected to the processing core that received the I/O operation, the read or write operation is performed across one of the inter-core links 119. For example, if the processing core 124 determines that the memory address range for a write operation received on one of its core ports 117 is within the memory component 126, the processing core 124 directs the write operation across one of the inter-core links 119 to the memory component 126. A processing core (e.g., 124) performing an I/O operation across an inter-core link (e.g., 119) to a memory component (e.g., 126) may be slower than the processing core performing an I/O operation to its own memory component (e.g., 128)—i.e., the memory component directly connected and dedicated to the processing core. Further, the available bandwidth to a memory component connected to a processing core across the inter-core links 119 is less than the bandwidth available to access the memory component directly connected to a processing core.

It may be desirable to manage I/O operations received at an IC (e.g., one of the ICs 112, 114, 116, 118 or 120) so that the IC directs the I/O operation to the processing core directly connected to the memory component (e.g., 126 or 128) corresponding to the I/O operation—i.e., the memory component including the memory address associated with the I/O operation. For ICs that are only connected to a single processing core (e.g., ICs 112 and 120), such management of I/O operations may not be possible, as the IC can only direct I/O operations to one processing core. ICs directly connected (e.g., via core ports) to multiple processing cores (e.g., ICs 114, 116 and 118) have potential to implement such management.

Figure 2:
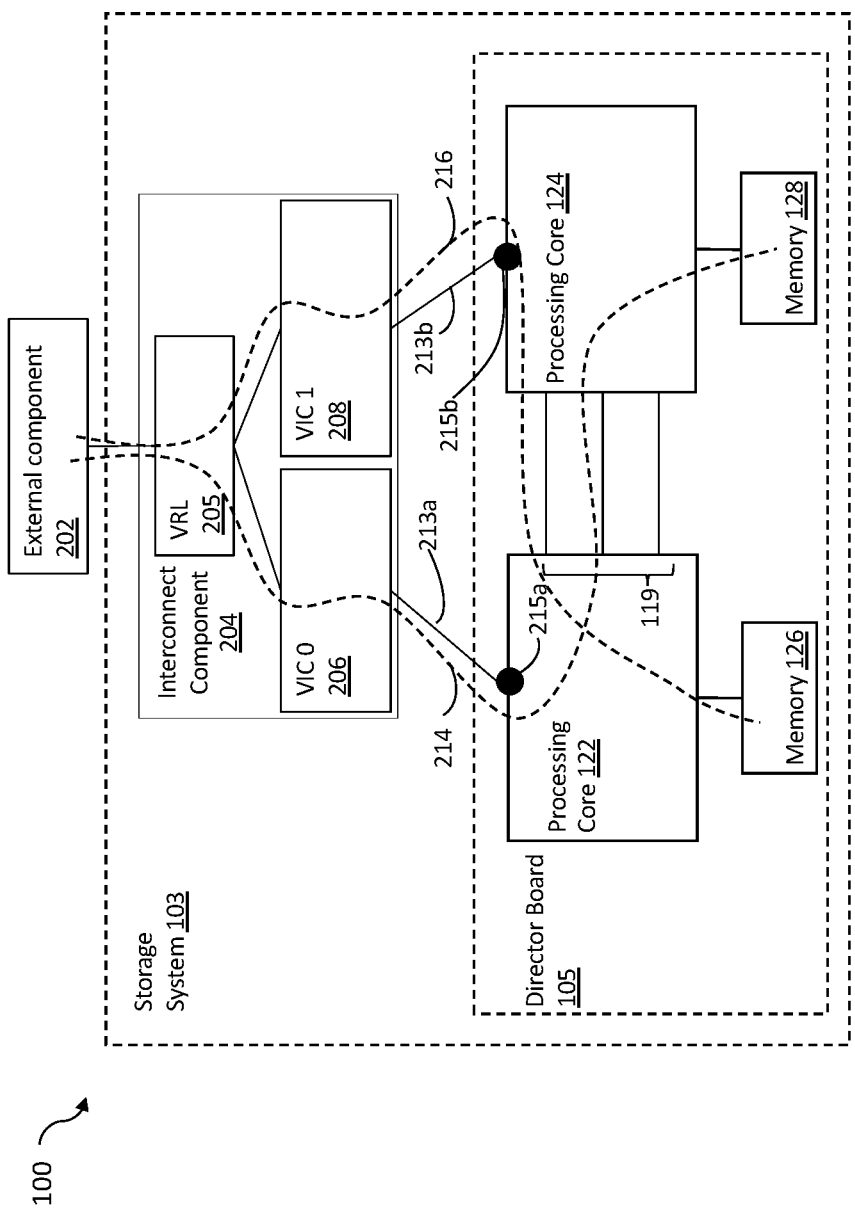
FIG. 2 is a block diagram illustrating an example of an interconnect component used as part of a system for processing I/O operations, according to embodiments of the invention.

FIG. 2 is a block diagram illustrating an example of an IC 204 directly connected to multiple processing cores 122 and 124, where the IC 204 may be used as part of the system 100 for processing I/O operations. The IC 204 may be one of the ICs 112, 114, 116, 118 and 120.

The IC 204 may include multiple virtual ICs (VICs), including VIC 0 206 and VIC 1 208 corresponding to processing cores 122 and 124, respectively. The IC 204 may include VIC routing logic (VRL) 205 that has knowledge of the VICs, including identifiers (IDs) of the VICs and the link and/or core port to which a VIC maps. For example, the VRL 205 may include or have access to a data structure that maps: an ID for VIC 0 206 to link 213*a* and/or core port 215*a*; and an ID for VIC 1 208 to link 213*b* and/or core port 215*b*.

The external component 202 (e.g., a host) may be configured with, or have access to, information about the VICs 206 and 208, including, for example, the processing core to which each VIC maps. Accordingly, although the external component 202 has only a single connection to the IC 204, the external component 202 may specify one of the VICs in its I/O communications (e.g., iSCSI commands), which will cause the I/O communication to be routed to the processing core associated with the VIC. For example, the external component 202 may specify an ID of VIC 1 208 in an I/O communication specifying a write operation sent to IC 204. The VRL 205 may receive the I/O communication and route it to the processing core 124.

While an IC directly connected to multiple cores may be configured as described with respect to the IC 204 to route I/O operations between multiple cores, it still may route an I/O operation to a processing core that is not directly connected to the memory component corresponding to the memory address range of the write operation—i.e., the memory address range of the one or more cache slots (i.e., cache lines) corresponding to the write operation. For example, an I/O communication received from the external component 202 at the IC 204 may specify an I/O operation and an ID of VIC 0 206. The VRL 205 may route the I/O operation to the VIC 0 206, which then may direct the I/O operation across the link 213*a* to the core port 215*a*. The processing core 122 then may determine that the memory address range of the I/O operation maps to the memory component 128 and direct the I/O operation across one of the inter-core links 119 to the memory component 128. Thus, the I/O operation follows an I/O path 214.

Analogously, an I/O communication received from external component 202 at the IC 204 may specify an I/O operation and an ID of VIC 1 208. The VRL 205 may route the I/O operation to the VIC 1 208, which then may direct the I/O operation across the link 213*b* to the core port 215*b*. The processing core 124 then may determine that the memory address range of the I/O operation maps to the memory component 126 and direct the I/O operation across one of the inter-core links 119 to the memory component 126. Thus, the I/O operation follows an I/O path 216. In both the cases of the I/O paths 214 and 216, memory access time is slowed by having to access memory across one or the inter-core links 119.

Figure 3B:
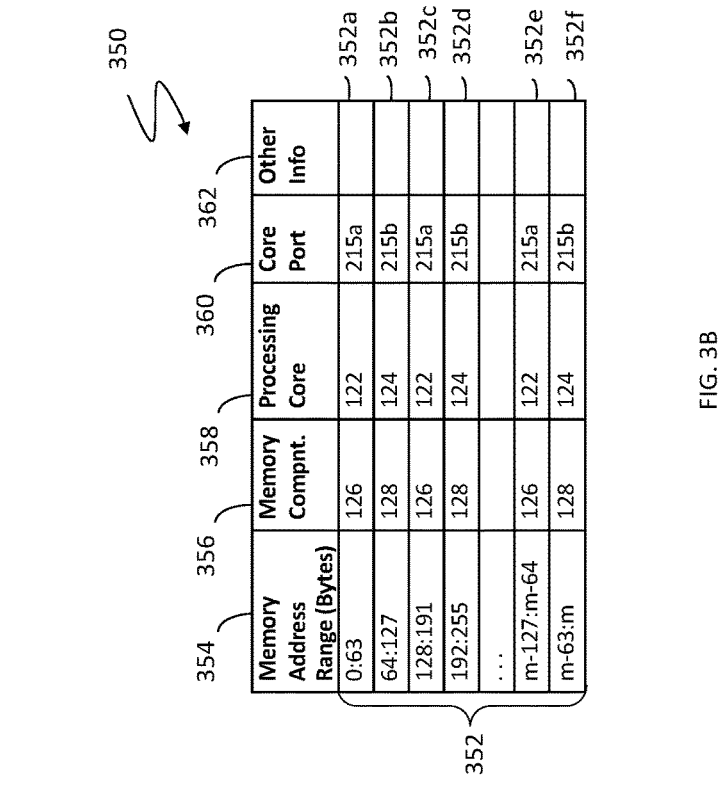
FIG. 3B is a block diagram illustrating an example of a data structure for mapping a memory address range to a processing core, according to embodiments of the invention.
Figure 3A:
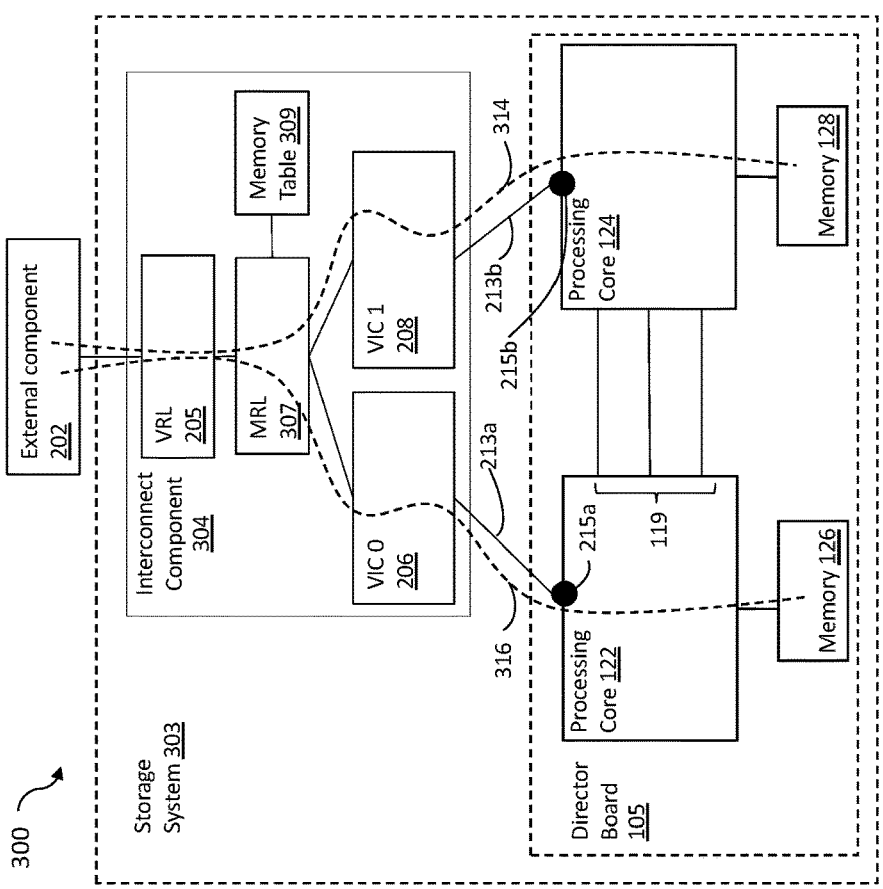
FIG. 3A is a block diagram illustrating an example of an interconnect component used as part of a system for processing I/O operations, including memory routing logic, according to embodiments of the invention.

In some embodiments of the invention, an IC connected to multiple processing may be configured (e.g., with memory routing logic) to route I/O operations received at the IC to the processing core directly connected to the memory component corresponding to the I/O operation, for example, as described in relation to FIG. 3A. FIG. 3A is a block diagram illustrating an example of an IC 304 used as part of a system 300 for processing I/O operations, including memory routing logic, according to embodiments of the invention. Other embodiments of an IC used as part of a system for processing I/O operations, for example, variations of the IC 304, are possible and are intended to fall within the scope of the invention.

The system 300 may include one or more of the system components described in relation to the system 100 in connection with FIGS. 1 and 2, and may include the IC 304 instead of the IC 104. The IC 304 may include any of: the VRL 205; the VIC 0 206; the VIC 1 208; memory routing logic (MRL) 307; a memory table 309; other components; or any suitable combination of the foregoing. In some embodiments, the system 300 may be part of a data storage network, including the hosts 102, 104 and 108, and a data storage system 303 (e.g., a PowerMax storage system), which may include any of the PSD(s) 106 and 110, one or more ICs (e.g., 112, 114, 116, 118 and 120) configured as the IC 304; the processing cores 122 and 124, the memory components 126 and 128, other components, or any suitable combination of the foregoing. In such embodiments, the storage system 303 may be connected to the hosts 102, 104 and 108 over one or more networks (not shown), for example, one or more network fabrics.

The MRL 307 may be configured with logic to: determine a memory address range corresponding to an I/O operation received from the external component 202; determine which memory component 126 or 128 includes the memory address range; and route the I/O operation to the processing core 122 or 124 directly connected to the determined memory component. The MRL 307 may determine which memory component 126 or 128 includes the memory address range by accessing a memory table 309, which may be implemented as data structure 350 described in relation to FIG. 3B.

FIG. 3B is a block diagram illustrating an example of a data structure 350 for mapping a memory address range to a processing core, according to embodiments of the invention. Other embodiments of a data structure 350 for mapping a memory address range to a processing core, for example, variations of the data structure 350, are possible and are intended to fall within the scope of the invention. The data structure 350 may be referred to herein as a memory table. The memory table 350 may include a plurality of entries 352. Each entry may specify: a memory address range in memory address range column 354 (or alternatively a starting memory address and an offset), where "m" is the highest memory address in the memory address space; an identifier (ID) of the memory component (e.g., 126 or 128) corresponding to the memory address range in memory component column 356; an ID of the processing core (e.g., 122 or 124) to which the memory component of the entry is dedicated; an ID of the core port (e.g., 215*a* or 215*b*) of the processing core identified in the entry; other information 362; and/or any suitable combination of the foregoing. For example, the entry 352*a* indicates that for a memory address range of 0 to 63, the memory component is 126, the processing core is 122 and the core port is 215*a*. The allocation of memory address ranges between the memory component 126 and 128 may be interleaved in accordance with a uniform memory access (UMA) scheme, as illustrated in the memory address range column 354. The UMA scheme is described in more detail elsewhere herein.

Returning to FIG. 3A, the MRL 307 may be configured to: use the determined address range of a received I/O operation (or a starting memory address) to lookup the corresponding entry in the memory table 309; select the memory component ID, processing core ID and/or core port ID; and route the I/O operation accordingly. For example, if the memory table 309 is implemented as the memory table 350, and the address range of the I/O operation is 160:191, then the MRL 307 may determine from the entry 352c that the memory component is the memory component 126, that the processing core is the processing core 124 and/or that the core port if the core port 215b. In some embodiments, the MRL 307 may be configured to determine a processing core ID and/or core port ID from a memory component ID from one or more other data structures.

In some embodiments, the MRL 307 may be configured with logic to perform a mathematical operation on the determine memory address of the I/O operation to determine the memory component. For example, a memory space of the system 300 may be allocated to memory components in such a way (e.g., even cache slots in the memory component 126 and odd cache slots in the memory component 128) that the memory component corresponding to a memory address can be determined by performing a mathematical operation (e.g., modulo or a hash function).

In some embodiments, the MRL 307 may be configured to override the processing core and/or core port determined by the VRL 205. For example, the VRL 205 may have determined the processing core (e.g., the processing core 124) associated with a VIC ID specified in an I/O communication received from the external component 202. However, the MRL 307 may determine that a different processing core (e.g., the processing core 122) is directly connected to the memory component corresponding to the memory address of the I/O communication, override the processing core determined by the VRL 205, and direct the I/O operation to the core port (e.g., the core port 215a) of the determined different processing core.

Figure 4:
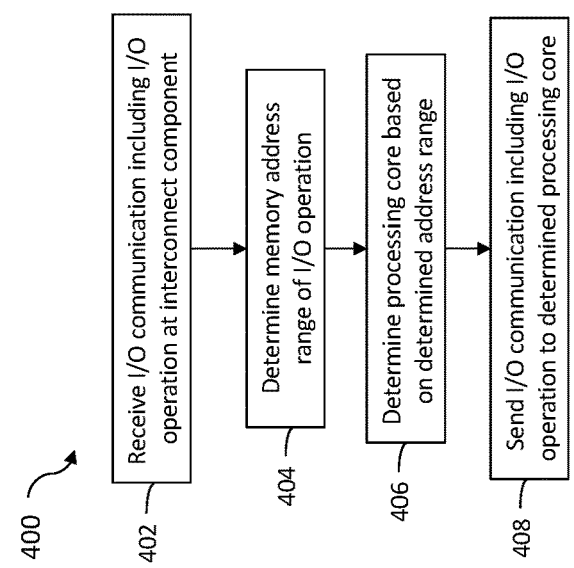
FIG. 4 is a flowchart illustrating an example of a method of an interconnect component processing I/O operations based on a memory range of the I/O operation, according to embodiments of the invention.

The MRL 307 may be configured to perform the method 400 described in connection with FIG. 4. FIG. 4 is a flowchart illustrating an example of a method 400 of an IC processing I/O operations based on a memory range of the I/O operation, according to embodiments of the invention. Other embodiments of an IC processing I/O operations based on a memory range of the I/O operation, for example, variations of the method 400, are possible and are intended to fall within the scope of the invention.

In a step 402, an I/O communication including an I/O operation may be received at an IC (e.g., the IC 304). In a step 404, the memory address range of the I/O operation may be determined. For example, the I/O operation may specify the memory address range, or a starting address and offset of the I/O operation. In some embodiments, in addition to or as an alternative to an address range, address and/or offset, the I/O communication may specify an ID of a logical storage unit (LSU), for example, a logical volume, LUN, logical device, thin device, storage group, or the like, which may be associated with a memory address range (e.g., one or more cache slots). For example, the IC may have access to one or more data structures that map an LSU ID to a memory address range, and determine the memory address range of an I/O operation based at least in part on these one or more data structures.

In a step 406, a processing core corresponding to the determined memory address range of the I/O operation may be determined, for example, as described in more detail in relation to the MRL 307.

In a step 408, an I/O communication including the I/O operation may be sent from the IC (e.g., the IC 304) to the determined processing core. Because the processing core was predetermined to be the processing core connected to the memory component corresponding to the I/O operation, communication across inter-core links 119 may be avoided, thus saving memory access time.

Performance of the method 400 on the same I/O operations that produced I/O paths 214 and 216 as described in connection with FIG. 2 may result in I/O paths 314 and 316, respectively, illustrated in FIG. 3A. For example, an I/O communication may be received by the IC 304 from the external component 202. The I/O communication may specify an I/O operation and an ID of VIC 0 206. The memory address range of the I/O operation may be an address range included in the memory component 128. The VRL 205 may determine to route the I/O operation to the VIC 0 206 based on the VIC ID. However, the MRL 307 may determine that the address range of the I/O operation is included within (i.e., maps to) the memory component 128, the processing core 124 and/or the core port 215b. Based on this determination, the MRL 307 may override the routing decision of the VRL 205 by routing the WO operation through the VIC 1 208 instead of the VIC 0 206, and the VIC 1 208 then may direct the I/O operation across the link 213b to the core port 215b. The processing core 124 then may determine that the memory address range of the I/O operation maps to the memory component 128, and access the memory component directly, as opposed to directing the I/O operation across one of the inter-core links 119 as in the case of the I/O path 214.

Similarly, consider the same I/O communication being received at the IC 304 from the external component 202 as the I/O communication that that was received by the IC 204 and resulted in the I/O path 216. This I/O communication may specify an I/O operation and an ID of VIC 1 208. The memory address range of the I/O operation may be an address range included in the memory component 126. The VRL 205 may determine to route the I/O operation to the VIC 1 208 based on the VIC ID. However, the MRL 307 may determine that the address range of the I/O operation is included within the memory component 126, the processing core 122 and/or the core port 215a. Based on this determination, the MRL 307 may override the routing decision of the VRL 205 by routing the I/O operation through the VIC 0 206 instead of the VIC 1 208, and the VIC 0 206 then may direct the I/O operation across the link 213a to the core port 215a. The processing core 122 then may determine that the memory address range of the I/O operation maps to the memory component 126 and access the memory component directly, as opposed to directing the I/O operation across one of the inter-core links 119 as in the case of the I/O path 216.

It should be appreciated that, in some embodiments, the MRL 307 may be situated (e.g., in a physical and/or logical sense) between the VICs 206 and 208 and the links 213a and 213b, respectively, as opposed to between the VRL 205 and the VICs 206 and 208. In such embodiments, the MRL 307 may be configured to route the I/O operations from the VICs 206 and 208 to the appropriate link 213a and 213b. Further, in some embodiments, the logic of the VRL 205 and the MRL 307 are integrated in a same logical and/or physical component of the IC 304. In addition, in some embodiments of the invention, VICs may not be used at all, and the MRL 307 may be configured to route I/O operations received at the IC 304 to the appropriate link 213a or 213b in accordance with the techniques described herein.

Use of inter-core links 119 may be avoided by an IC routing I/O operations based on memory addresses ranges in accordance with embodiments described herein. Avoiding use of the inter-core links may increase memory access times and thus improve system performance, However, depending on how a memory space is allocated between memory components, congestion may persist on one or more of the processing cores and/or links thereto. For example, consider the example of having two processing cores 122 and 124 with dedicated memory components 126 and 128, respectively, and a memory space having and address range 0:m. A non-uniform memory access (NUMA) memory allocation scheme may be implemented, in which the memory space is divided into just two contiguous address ranges 0:n−1 and n:m, and one contiguous address range 0:n−1 is allocated to the memory component 126, and the other contiguous address range n:m is allocated to the other memory component 128. In such cases, there is potential that a sub-address range (e.g., a zone) within one of these two address ranges (allocated to the one of the memory components) gets "hot," for example, in which an application corresponding to an LSU associated with sub-address range has a high frequency of I/O operations; whereas the other of the two address ranges (allocated to the other memory component) remains relatively cold. In such scenarios, the high rate of I/O operations for one of the memory components may strain the bandwidth on the corresponding processing core and links thereto, causing congestions thereon, which may cause delays in processing I/O operations.

To reduce a risk of such congestion caused by such hot zones, a UMA scheme may be implemented, in which smaller sub-ranges of the memory space are allocated in an interleaving fashion between memory components, for example, as illustrated in the memory table 350 shown in FIG. 3B. The sub-ranges may be a multiple (e.g., 1×, 2×, 4×, etc.) of a cache slot size, and thus may include one or more cache slots. For example, if a cache slot size is 16 Bytes, the size of an interleaved subrange may be 16 Bytes, 32 Bytes, 64 Bytes or even more. Other cache slot sized, and multiple of same for sub-ranges, may be used.

In memory table 350, the memory space is divided into 64 Byte chunks, and these chunks are allocated in an alternating manner between the two memory components 126 and 128. For example, as indicated in entries 352a, 352c and 352e, the chunks 0:63; 128:191 and m−127:m−64 (e.g., odd chunks) are allocated to memory component 126, and the chunks 64:127; 192:255 and m−63:m (e.g., even chunks) are allocated to memory component 128. Ideally, such a memory allocation will result in about 50% of memory accesses to each of the memory components 126 and 128.

Figure 5:
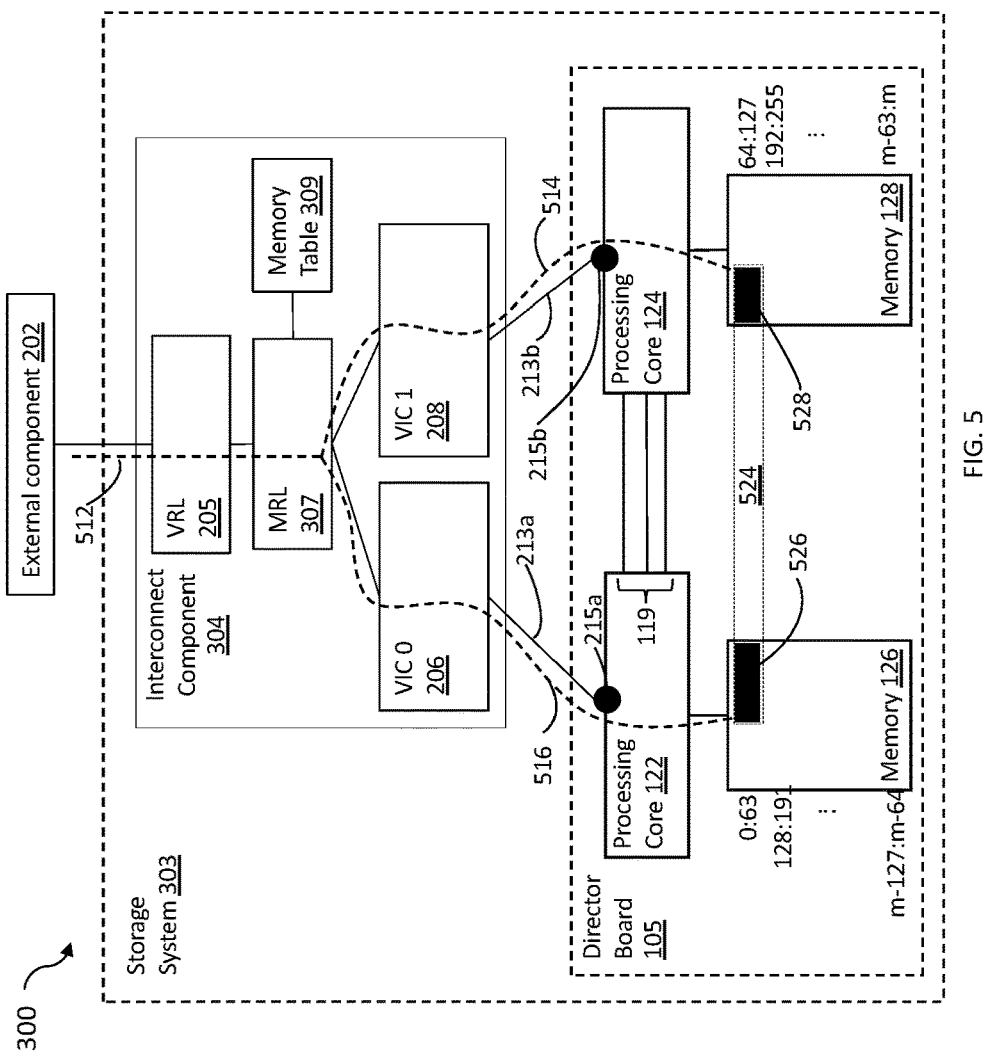
FIG. 5 is a block diagram illustrating an example of a system for processing I/O operations, including and interconnect component with memory routing logic, the system employing a uniform memory access scheme, according to embodiments of the invention.

FIG. 5 is a block diagram illustrating an example of a system 300 for processing I/O operations, including an IC 303 with memory routing logic 307, the system employing a UMA scheme, according to embodiments of the invention. Other embodiments of a system for processing I/O operations, for example, variations of the system 300, are possible and are intended to fall within the scope of the invention. The memory space of the system (or at least a portion thereof) may be allocated uniformly, in an interleaved manner, between memory components 126 and 128 in accordance with the memory table 350.

Such a UMA scheme may reduce an amount of congestion on a processing core and links thereto. In some embodiments, a combination of a UMA memory allocation scheme and an IC routing I/O operations based on a memory address range of the I/O operation may result in faster memory access times and reduced congestion on any one processing core.

In some cases, a memory address range of an I/O operation may span address ranges on both memory components 126 and 128. In such cases, the memory operation may be split into multiple sub-operations, each sub-operation corresponding to one or the memory components and the data of the I/O operation associated therewith. For example, an I/O communication may be received from the external component 202 along I/O path 512. The I/O communication may include an I/O operation corresponding to a memory address of 32-95 Bytes 524 of a memory space of the system 300. The MRL may determine (e.g., from entries 352a and 352b of the memory table 350) that the memory address sub-range of 32-63 Bytes 526 corresponds to memory component 126, processing core 122 and/or core port 215a, and that the memory address sub-range of 64-95 Bytes 528 corresponds to memory component 128, processing core 124 and/or core port 215b. As a result, the MRL 307 may split the I/O operation into two I/O operations: a first I/O operation for the data of the sub-range 32-63 Bytes 526 along I/O path 516; and a second I/O operation for the data of the sub-range 64-95 Bytes 528 along I/O path 516. The first I/O path includes the VIC 0 206, the link 213a, the core port 215a, the processing core 122 and memory 126, and the second I/O path includes the VIC 1 208, the link 213b, the core port 215b, the processing core 124 and memory 128.

Various embodiments of the invention may be combined with each other in appropriate combinations. Additionally, in some instances, the order of steps in the flowcharts, flow diagrams and/or described flow processing may be modified, where appropriate. It should be appreciated that any of the techniques described herein, including method 400, or parts thereof, may be implemented using one or more of the systems and/or data structures described in relation to FIGS. 1-3B and 5, or components thereof. Further, various aspects of the invention may be implemented using software, firmware, hardware, a combination of software, firmware and hardware and/or other computer-implemented modules or devices having the described features and performing the described functions.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include

[a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a system including a plurality processing cores for processing I/O operations and at least one interconnect component for communicatively coupling one or more external components to the plurality of processing cores, the at least one interconnect component directly physically connected to each of the plurality of processing cores, a method comprising:
   receiving an I/O communication at a first of the at least one interconnect component, the I/O communication specifying an I/O operation associated with a memory address range;
   determining a first of the plurality of processing cores that corresponds to the I/O communication based at least in part on the memory address range; and
   sending a second I/O communication specifying at least a first portion of the I/O operation to the first processing core based at least in part on the determination that the first processing core corresponds to the I/O communication.

2. The method of claim 1, wherein the system further comprises a plurality of memory components, each of the plurality of memory components dedicated to a respective one of the plurality of processing cores, wherein the method further comprises:
   determining that a first memory component of the plurality of memory components corresponds to at least a first portion the memory address range, wherein the first memory component is dedicated to the first processing component, and
   wherein the determination of the first processing core is based at least in part on the determination that the first memory component corresponds to the at least first portion of the memory address range.

3. The method of claim 2, further comprising:
   determining that a second memory component of the plurality of memory components corresponds to at least a second portion the memory address range, wherein the second memory component is dedicated to a second of the plurality of processing components, and
   sending a third I/O communication specifying at least a second portion of the I/O operation to the second processing core based at least in part on the determination that the second memory component of the plurality of memory components corresponds to the at least a second portion the memory address range.

4. The method of claim 1, wherein the system further includes a data structure including a plurality of entries, each entry specifying a memory address range and a processing core corresponding to the memory address range, and
   wherein determining the first of the plurality of processing cores includes accessing an entry of the data structure that specifies at least a portion of the memory address associated with the I/O operation.

5. The method of claim 1, wherein determining the first of the plurality of processing cores includes performing a mathematical operation on the memory address range, and selecting the first of the plurality of processing cores based on the result of the mathematical operation.

6. The method of claim 1, wherein the first I/O communication specifies a port associated with a second of the plurality of processing cores, and
   wherein determining a first of the plurality of processing cores includes overriding the specification of the port.

7. The method of claim 1, wherein the plurality of processing cores includes only two processing cores, including the first processing core and a second processing core, in which a memory space of the system is interweaved between the first processing core and the second processing core according to a uniform memory access scheme.

8. A system comprising:
   a plurality processing cores for processing I/O operations;
   at least one interconnect component for communicatively coupling one or more external components to the plurality of processing cores, the at least one interconnect component directly physically connected to each of the plurality of processing cores; and
   at least one memory component having code stored thereon that, when executed, performs a method including:
      receiving an I/O communication at a first of the at least one interconnect component, the I/O communication specifying an I/O operation associated with a memory address range;
      determining a first of the plurality of processing cores that corresponds to the I/O communication based at least in part on the memory address range; and
      sending a second I/O communication specifying at least a first portion of the I/O operation to the first processing core based at least in part on the determination that the first processing core corresponds to the I/O communication.

9. The system of claim 8, wherein the system further comprises a plurality of memory components, each of the plurality of memory components dedicated to a respective one of the plurality of processing cores, wherein the method further comprises:
   determining that a first memory component of the plurality of memory components corresponds to at least a first portion the memory address range, wherein the first memory component is dedicated to the first processing component, and
   wherein the determination of the first processing core is based at least in part on the determination that the first memory component corresponds to the at least first portion of the memory address range.

10. The system of claim 9, wherein the method further comprises:
    determining that a second memory component of the plurality of memory components corresponds to at least a second portion the memory address range, wherein the second memory component is dedicated to a second of the plurality of processing components, and
    sending a third I/O communication specifying at least a second portion of the I/O operation to the second processing core based at least in part on the determination that the second memory component of the plurality of memory components corresponds to the at least a second portion the memory address range.

11. The system of claim 8, wherein the system further includes a data structure including a plurality of entries, each entry specifying a memory address range and a processing core corresponding to the memory address range, and
  wherein determining the first of the plurality of processing cores includes accessing an entry of the data structure that specifies at least a portion of the memory address associated with the I/O operation.

12. The system of claim 8, wherein determining the first of the plurality of processing cores includes performing a mathematical operation on the memory address range, and selecting the first of the plurality of processing cores based on the result of the mathematical operation.

13. The system of claim 8, wherein the first I/O communication specifies a port associated with a second of the plurality of processing cores, and
  wherein determining a first of the plurality of processing cores includes overriding the specification of the port.

14. The system of claim 8, wherein the plurality of processing cores includes only two processing cores, including the first processing core and a second processing core, in which a memory space of the system is interweaved between the first processing core and the second processing core according to a uniform memory access scheme.

15. For a system including a plurality processing cores for processing I/O operations and at least one interconnect component for communicatively coupling one or more external components to the plurality of processing cores, the at least one interconnect component directly physically connected to each of the plurality of processing cores, one or more non-transitory computer-readable media having software stored thereon comprising:
  executable code that receives an I/O communication at a first of the at least one interconnect component, the I/O communication specifying an I/O operation associated with a memory address range;
  executable code that determines a first of the plurality of processing cores that corresponds to the I/O communication based at least in part on the memory address range; and
  executable code that sends a second I/O communication specifying at least a first portion of the I/O operation to the first processing core based at least in part on the determination that the first processing core corresponds to the I/O communication.

16. The one or more non-transitory computer-readable media of claim 15, wherein the system further comprises a plurality of memory components, each of the plurality of memory components dedicated to a respective one of the plurality of processing cores, wherein the software further comprises:
  executable code that determines that a first memory component of the plurality of memory components corresponds to at least a first portion the memory address range, wherein the first memory component is dedicated to the first processing component, and
  wherein the determination of the first processing core is based at least in part on the determination that the first memory component corresponds to the at least first portion of the memory address range.

17. The one or more non-transitory computer-readable media of claim 16, wherein the software further comprises:
  executable code that determines that a second memory component of the plurality of memory components corresponds to at least a second portion the memory address range, wherein the second memory component is dedicated to a second of the plurality of processing components, and
  executable code that sends a third I/O communication specifying at least a second portion of the I/O operation to the second processing core based at least in part on the determination that the second memory component of the plurality of memory components corresponds to the at least a second portion the memory address range.

18. The one or more non-transitory computer-readable media of claim 15, wherein the system further includes a data structure including a plurality of entries, each entry specifying a memory address range and a processing core corresponding to the memory address range, and
  wherein determining the first of the plurality of processing cores includes accessing an entry of the data structure that specifies at least a portion of the memory address associated with the I/O operation.

19. The one or more non-transitory computer-readable media of claim 15, wherein determining the first of the plurality of processing cores includes performing a mathematical operation on the memory address range, and selecting the first of the plurality of processing cores based on the result of the mathematical operation.

20. The one or more non-transitory computer-readable media of claim 15, wherein the first I/O communication specifies a port associated with a second of the plurality of processing cores, and
  wherein determining a first of the plurality of processing cores includes overriding the specification of the port.

* * * * *